United States Patent [19]

Lawson et al.

[11] Patent Number: 4,919,003
[45] Date of Patent: Apr. 24, 1990

[54] VIDEO GAME AND THE LIKE CONTROL ASSEMBLY

[75] Inventors: James L. Lawson, Liverpool; David C. Harris, Dewitt, both of N.Y.

[73] Assignee: The Torrington Company, Torrington, Conn.

[21] Appl. No.: 823,988

[22] Filed: Jan. 31, 1986

Related U.S. Application Data

[63] Continuation of Ser. No. 505,339, Jun. 17, 1983, abandoned.

[51] Int. Cl.⁵ .............................................. G05G 9/00
[52] U.S. Cl. ............................... 74/471 XY; 384/512
[58] Field of Search ............................ 340/347 P, 710; 250/570; 350/273; 74/471 XY; 384/512, 531, 532; 403/345, 359, 375

[56] References Cited

U.S. PATENT DOCUMENTS

| 58,739 | 10/1866 | Bailly et al. | 384/512 |
| 648,352 | 4/1900 | Blanton | 403/359 |
| 1,210,921 | 1/1917 | Focardi | 384/512 |
| 2,629,165 | 2/1953 | Stillwagon | 384/512 |
| 3,264,016 | 8/1966 | Reisch | 403/375 X |
| 3,395,589 | 8/1968 | Gesten | 74/471 XY |
| 3,625,083 | 12/1971 | Bose | 74/471 XY |
| 3,734,583 | 5/1973 | Hosnedl et al. | 384/512 |
| 4,404,865 | 9/1983 | Kim | 74/471 XY |

FOREIGN PATENT DOCUMENTS

| 62451 | 5/1975 | Australia | 403/359 |

Primary Examiner—Noah P. Kamen
Attorney, Agent, or Firm—Frank S. Troidl

[57] ABSTRACT

A manually controlled ball is rotatable in any direction at variable speeds to operate a pair of perpendicular rotatable shafts. Each shaft is rotated at a speed of and direction dependent upon the direction and speed of rotation of the manually operated ball. An encoder disk is mounted on each shaft. The direction and speed of the disk rotation is translated into electrical signals.

1 Claim, 1 Drawing Sheet

VIDEO GAME AND THE LIKE CONTROL ASSEMBLY

This application is a continuation of application Ser. No. 505,339, filed June 17, 1983, now abandoned.

BACKGROUND OF THE INVENTION

This invention relates to apparatus for converting mechanical motion into electric signals. More particularly, this invention is a new mechanical control assembly which is used in converting mechanical motion into electronic signals used to move graphic displays on a screen.

Certain currently used electro-mechanical devices for providing graphic displays on an electronic screen include a manually operated control ball. The movement of the ball is converted into a graphic display on an electronic screen by a linkage including mechanical, electrical, and optical elements. These devices are used, for example, in certain video games, computers, and also have industrial, commercial, and military applications.

Briefly described, this invention includes a manual control ball rotatable in any direction at variable speeds. A pair of perpendicular rotatable shafts each tangentially contact the control ball. Each rotatable shaft is formed with a pair of circumferential grooves which are axially spaced on opposite sides of the control ball-shaft contact point. The circumferential grooves provide inner bearing raceways. A pair of outer bearing rings with outer raceways surround each shaft at locations at which the inner and outer raceways form pairs of cooperating raceways. Sets of rolling elements are located in each cooperating pair of raceways.

Preferably each shaft is provided with a straight knurled end. An encoder disk is mounted on the knurled end. The encoder disk has a central opening formed by a plurality of circumferentially spaced notches defining a plurality of inwardly projecting fingers positioned to deflect slightly and grip the knurles tightly.

BRIEF DESCRIPTION OF THE DRAWINGS

The invention as well as its many advantages may be further understood by reference to the following detailed description and drawings in which.

In the various figures, like parts are referred to by like numbers.

DESCRIPTION OF PREFERRED EMBODIMENT

Figure 1:
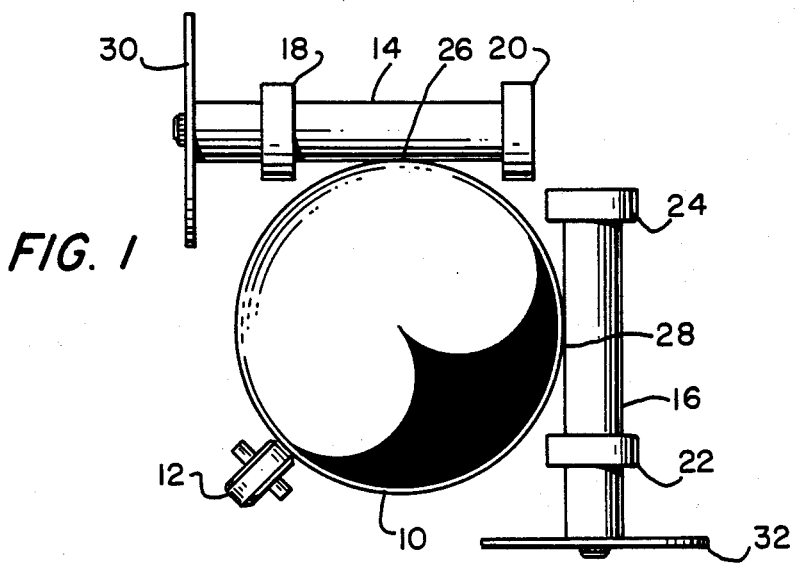
FIG. 1 is a top view showing the relationship of the control ball and the rotatable shafts operated by the ball.

Referring to the drawings and, more particularly, to FIG. 1, the manually rotatable control ball 10 is shown contacting an idler bearing 12 and a pair of perpendicularly located rotatable shafts 14 and 16. Shaft 14 is supported by bearings 18 and 20. Shaft 16 is supported by bearings 22 and 24. The manual control ball 10 with the shafts 14 and 16 and idler bearing 12 is usually mounted within a housing or support (not shown). A table or covering on the housing or support covers the shafts and idler bearing but the top portion of the control ball 10 extends above the top of the table so that it can be manually operated by the operator.

The shafts 14 and 16 contact the control ball 10 at points 26 and 28, respectively. The control ball-shaft contact points 26 and 28 are located approximately midway between bearings 18, 20 on shaft 14 and bearings 22, 24 on shaft 16, respectively. The control ball-shaft contact points 26 and 28 are circumferentially spaced approximately 90 degrees on the control ball 10 and are on the same plane through the control ball. Thus, when the control ball is rotated in a direction parallel to the axis of the shaft 14, shaft 14 will not rotate while shaft 16 rotates. If the control ball 10 is rotated in a direction parallel to the axis of shaft 16, shaft 16 will not rotate but shaft 14 will rotate. Since the ball may be rotated in any direction and speed, if the control ball 10 is rotated in any direction other than parallel to the axis of the shaft 14 or parallel to the axis of the shaft 16, each shafts 14 and 16 will rotate in a direction and at speeds dependent upon the direction and rotational speed of the control ball 10.

Figure 3:
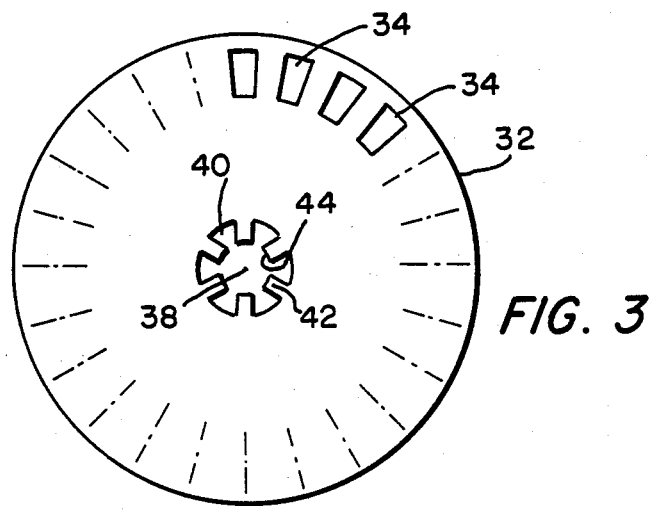
FIG. 3 is a front view of the encoder disk used on the shafts.

Encoder disks 30 and 32 are mounted on one end of rotatable shafts 14 and 16, respectively. Referring to FIG. 3, each encoder disk is provided with circumferentially equally spaced windows 34. An optical encoder (not shown) senses the speed and direction of the disk rotation, translating that motion into electrical signals, which in turn, are electronically displayed on a screen (not shown).

Figure 2:
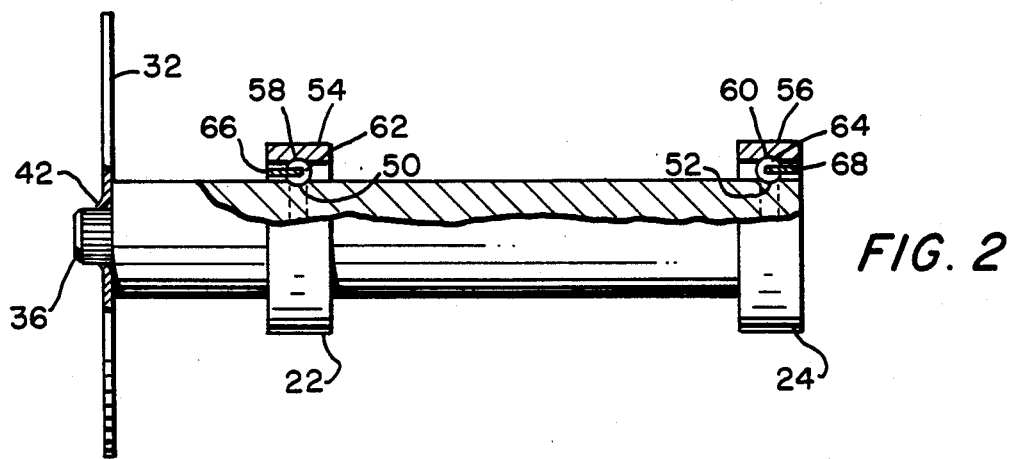
FIG. 2 is a side view, partly in section, showing the detailed construction of the shafts of FIG. 1.

An important feature of the invention is the manner in which the encoder disks are attached to the shafts 14 and 16. Referring to FIG. 2 an inexpensive knurling operation is performed on the end of the shaft at the mounting location of the encoder disk 32 to provide a straight knurled end 36. Referring to FIG. 3 the encoder disk 32 has a central opening 38 and a plurality of circumferentially equally spaced notches 40 extending outwardly from the central opening 38 defining a plurality of inwardly projecting circumferentially equally spaced projections or fingers 42. The radius of central opening 38 is less than the radius of the knurled end 36. Thus when the encoder disk, such as disk 32, is placed on the knurled end of shaft 16, the fingers deflect slightly and grip the knurles tightly as shown in FIG. 2.

The shaft 16 is assembled to the encoder disk 32 simply by inserting the knurled end 36 into the hole 38. This insertion is made with only a very small force. However, once the rotatable shaft 16 and disk 32 are assembled, they are gripped very tightly together and cannot be separated or loosened in use.

Another important feature of the invention is the provision directly on each shaft, such as shaft 16, of a pair of circumferential grooves 50 and 52 which are axially spaced the same distance on opposite sides of the control ball 1-shaft contact point 28. With conventional systems of this kind, a separate bearing is placed over a shaft of constant diameter. In our new device, rather than have a separate inner race provided on a separate bearing, the grooves 50 and 52 provide the inner bearing raceways.

A pair of outer bearing rings 54 and 56 are located about each shaft. The outer bearing rings 54 and 56 are provided with annular raceways 58 and 60, respectively, and surround the shaft 16 at locations at which the inner and outer raceways form pairs of cooperating raceways. Sets of rolling members such as balls 62 and 64 are located in the raceways of the bearings. In the embodiment shown, the balls 58 and 60 are kept in position with respect to one another by the finger cages 66 and 68, respectively.

By putting the ball grooves 50 and 52 directly into the rotating shaft to form the track grooves for the steel balls to roll on, the conventional inner rings of a bearing are eliminated. This eliminates assembly time and provides a complete and operable single unit.

We claim:

1. In combination: a manual control ball rotatable in any direction at variable speeds; a pair of perpendicular rotatable shafts each contacting the control ball at a control ball-shaft contact point, each rotatable shaft having a pair of circumferential grooves, one circumferential groove being axially spaced on the opposite side of the control ball-shaft contact point from the other circumferential groove, said circumferential grooves providing inner ball raceways; a pair of outer bearing rings on each shaft, each ring having an inner circumferential groove forming an outer ball raceway, balls located in the raceways; and an encoder disk mounted on each rotatable shaft.

* * * * *